(12) United States Patent
Hughes (10) Patent No.: US 6,938,339 B2
(45) Date of Patent: Sep. 6, 2005

(54) METHOD AND APPARATUS FOR FORMING AN INLET AND OUTLET FACE OF A CATALYST SUPPORT

(75) Inventor: Katherine W. Hughes, Corning, NY (US)

(73) Assignee: Corning Incorporated, Corning, NY (US)

( * ) Notice: Subject to any disclaimer, the term of this patent is extended or adjusted under 35 U.S.C. 154(b) by 298 days.

(21) Appl. No.: 10/008,060

(22) Filed: Nov. 13, 2001

(65) Prior Publication Data

US 2002/0073811 A1 Jun. 20, 2002

Related U.S. Application Data

(60) Provisional application No. 60/256,879, filed on Dec. 19, 2000.

(51) Int. Cl.$^7$ ................................................. B26D 1/02
(52) U.S. Cl. ........................ 29/890; 29/890.8; 83/651.1; 83/661
(58) Field of Search ................................ 83/651.1, 661, 83/875; 451/306, 307, 296; 29/890, 890.8

(56) References Cited

U.S. PATENT DOCUMENTS

| | | | | |
|---|---|---|---|---|
| 2,972,669 A | * | 2/1961 | Brown | 83/171 |
| 3,059,306 A | * | 10/1962 | Hamilton | 83/862 |
| 3,064,111 A | * | 11/1962 | Newman | 219/221 |
| 4,208,931 A | * | 6/1980 | Collins | 83/44 |
| 4,235,656 A | * | 11/1980 | Shimada et al. | 29/598 |
| 4,598,063 A | * | 7/1986 | Retallick | 502/439 |
| 4,779,497 A | * | 10/1988 | Lee | 83/16 |
| 4,782,570 A | * | 11/1988 | Spridco | 29/890 |
| 5,411,711 A | * | 5/1995 | Swars | 422/177 |
| 5,429,163 A | * | 7/1995 | Frenkel et al. | 144/364 |
| 5,487,694 A | | 1/1996 | Deming | |
| 5,564,409 A | | 10/1996 | Bonzo et al. | |
| 5,666,872 A | * | 9/1997 | McDonald et al. | 83/871 |
| 6,368,726 B1 | * | 4/2002 | Holpp et al. | 428/593 |
| 6,623,704 B1 | * | 9/2003 | Roth | 422/179 |

FOREIGN PATENT DOCUMENTS

| | | |
|---|---|---|
| DE | 2201881 | 7/1973 |
| DE | 2428964 | 1/1976 |

OTHER PUBLICATIONS

A. Heibel et al., "A New Converter Concept Providing Improved Flow Distribution and Space Utilization", Doc. No. 1999–01–0768, Book No. SP–1409, Session: Advanced Converter Concepts (Part A&B), SAE International Congress & Exposition, Detroit, MI, USA, (Mar. 1999).

* cited by examiner

Primary Examiner—Derris H. Banks
Assistant Examiner—Dana Ross
(74) Attorney, Agent, or Firm—Kees van der Sterre (57) ABSTRACT

An apparatus for forming shaped surfaces of an elongate substrate is disclosed. The apparatus includes a first and second collar spaced along the substrate, wherein a cutting filament extends between the collars. The collars are selectively rotated to pass the cutting filament through the substrate and form a shaped surface. The shaped surface can include conical or frustoconical shapes.

7 Claims, 9 Drawing Sheets

METHOD AND APPARATUS FOR FORMING AN INLET AND OUTLET FACE OF A CATALYST SUPPORT

This application claims the benefit of U.S. Provisional No. 60/256,879, filed Dec. 19, 2000, entitled "Method and Apparatus of Forming a Inlet and Outlet Face of a Catalyst Support", by Katherine W. Hughes.

FIELD OF THE INVENTION

The present invention relates to catalyst supports in catalytic converters for purifying exhaust gases, and more particularly to shaping at least one of an inlet face and an outlet face of a ceramic catalyst support, wherein the inlet and outlet faces can include a conical or frusto-conical surface.

BACKGROUND OF THE INVENTION

Early exhaust gas purifying systems included a cylindrically shaped catalyst coated honeycomb substrate having a flat inlet face. Although this conventional system effectively converted pollutants into non-toxic gases, the design tended to exhibit non-uniform flow distribution. Specifically, the high velocity exhaust gases which were emitted from a relatively small diameter exhaust pipe of an internal combustion engine did not dissipate when passing from the exhaust pipe into the larger diameter casing in which the catalyst substrate was located. As a result, a large portion of the high velocity exhaust gas tended to flow through the center of the honeycomb structure than through the peripheral portion. As a result of this non-uniform flow distribution of exhaust gases through the center, these catalytic converter systems exhibited a loss of conversion efficiency, as well as deactivation of the converter in the region of highest flow velocity. In addition, the non-uniform flow distribution tended to result in a higher pressure drop across the catalyst structure which in turn results in the decreased engine performance.

A variety of attempts have been made to increase the efficiency of the catalytic converter structure. These attempts have included altering the expansion angle between the inlet and the casing. However, the resulting flow still creates non-uniform flow distribution.

Therefore, a need exists for a catalyst substrate that can enhance uniform gas flow through the substrate and hence the catalytic converter. The need also exists for a catalyst substrate that can provide greater surface area without requiring increased casing volume. The further need exists for forming a catalyst substrate by an economically acceptable process, wherein the resulting substrate can be formed to match the profile of a desired casing or can. The need further exists for a method and apparatus for manufacturing substrates that can have a shaped inlet and outlet face.

SUMMARY OF THE INVENTION

The present invention includes an apparatus for shaping a face of a catalyst substrate. The face can be an inlet face or an outlet face, and can be shaped to include a conical or frusto-conical surface. The present system provides for the formation of a monolithic ceramic catalyst substrate having at least one of the inlet face or the outlet face defined by a conical or frusto-conical surface. The present invention can shape the face of a green, dried, calcined or fired ceramic substrate. By shaping at least one of the inlet or outlet faces, a greater volume of substrate can be enclosed in industry accepted casing volumes. Further, the present apparatus can be employed to shape a substrate that can be any of a variety of materials to support a broad spectrum of catalysts. The present invention also allows the catalyst substrate to be nearer the engine, thus facilitating heat up of the catalyst.

In a first configuration, the apparatus includes a pair of guides are spaced along a longitudinal dimension of the substrate. A cutting filament extends between the guides. To shape the face of the substrate, the guides are rotated about the longitudinal axis of the substrate. This rotation causes the cutting filament to pass through substrate thereby shaping the face. By controlling the longitudinal separation of the guides and the radial spacing of the guides from the longitudinal axis of the substrate, a variety of shaped faces can be formed. The shaped faces can be concentric or non-concentric with the longitudinal axis of the catalyst substrate. In addition, the shaped faces can be symmetric or asymmetric with respect to the ends of the shaped catalyst substrate or the longitudinal axis of the catalyst substrate. Generally, the method includes rotating a length of cutting filament about a path that defines the surface of the shaped face. The cutting filament extends along a length of the substrate and is translated to intersect the longitudinal axis of the substrate.

DETAILED DESCRIPTION OF THE PREFERRED EMBODIMENTS

Figure 1:
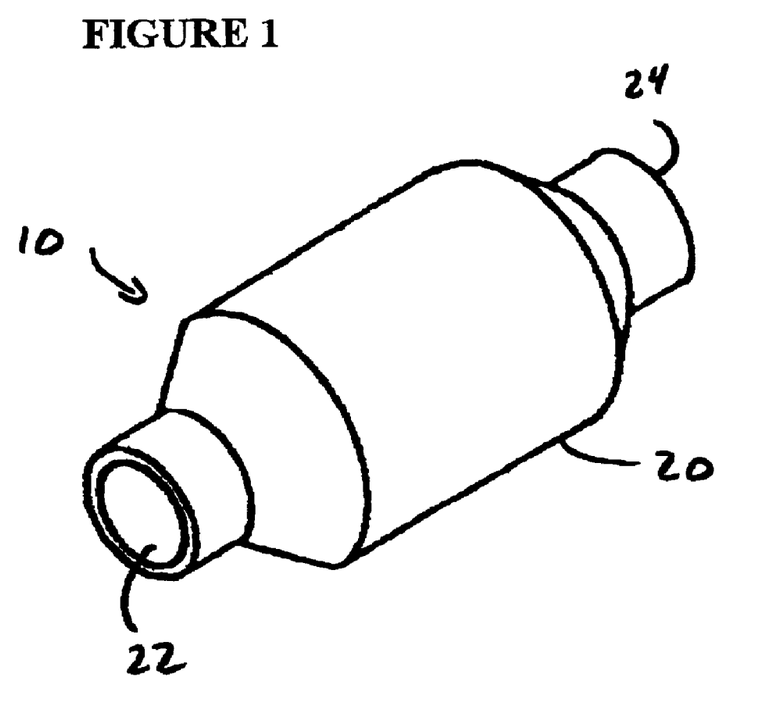
FIG. 1 is a perspective view of a casing for operably retaining a catalyst substrate.
Figure 2:
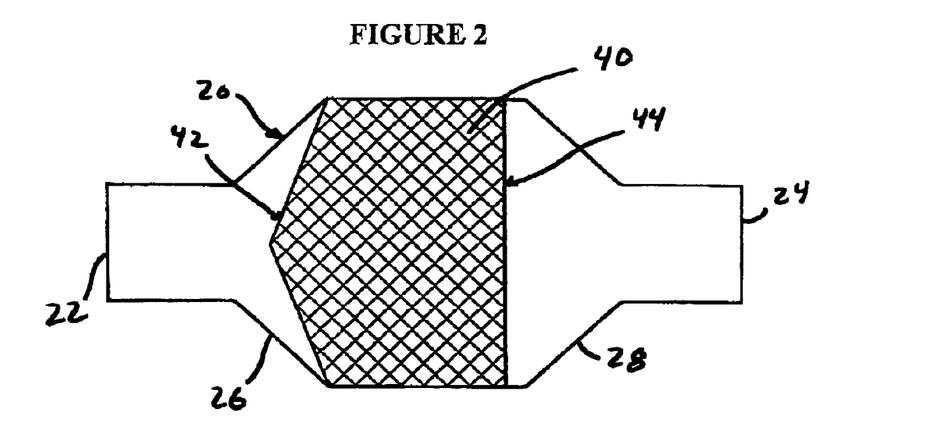
FIG. 2 is a side elevational cross-sectional view of a casing and a catalyst substrate having a conical shaped inlet face.
Figure 3:
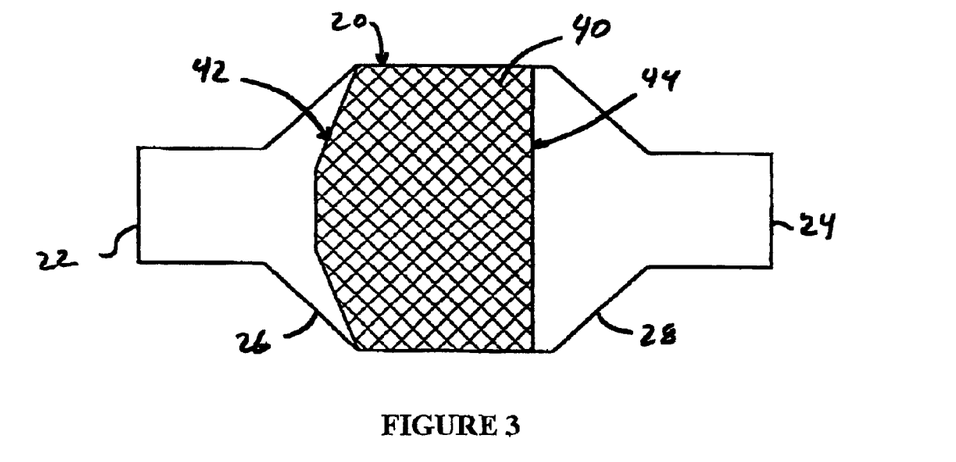
FIG. 3 is a side elevational view of an inline casing and a catalyst substrate having a frustoconical inlet face.
Figure 4:
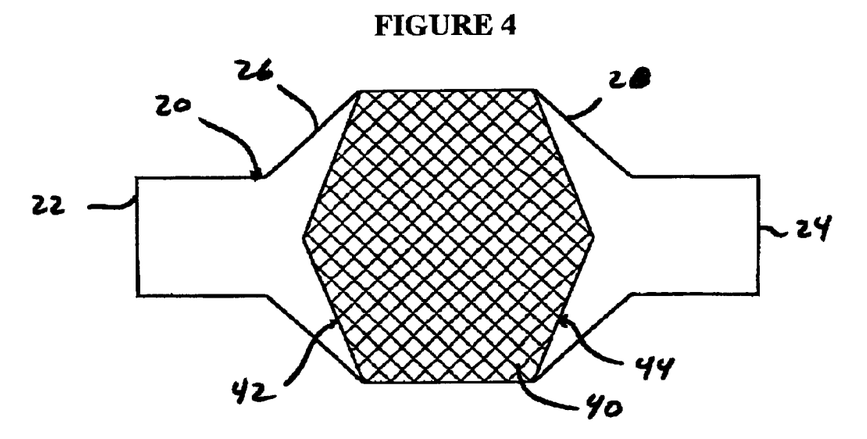
FIG. 4 is a side elevational view of an inline casing and a catalyst substrate having a conical inlet face and conical outlet face.
Figure 5:
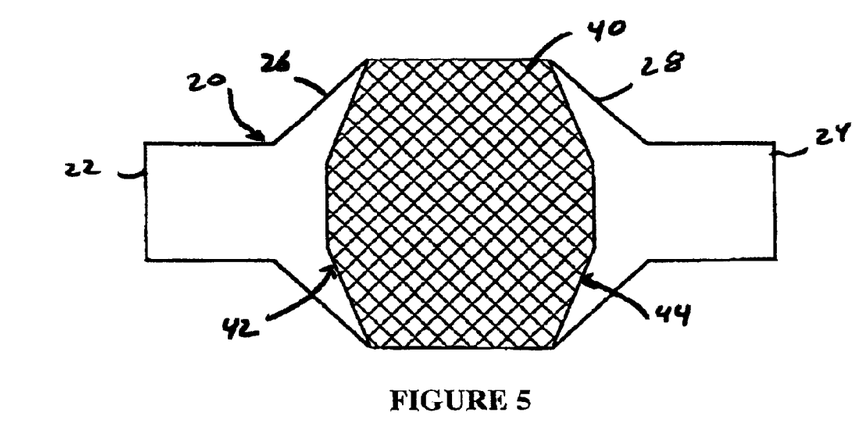
FIG. 5 is a side elevational view of an inline casing and a catalyst substrate having a frustoconical inlet and frusto-conical outlet face.
Figure 6:
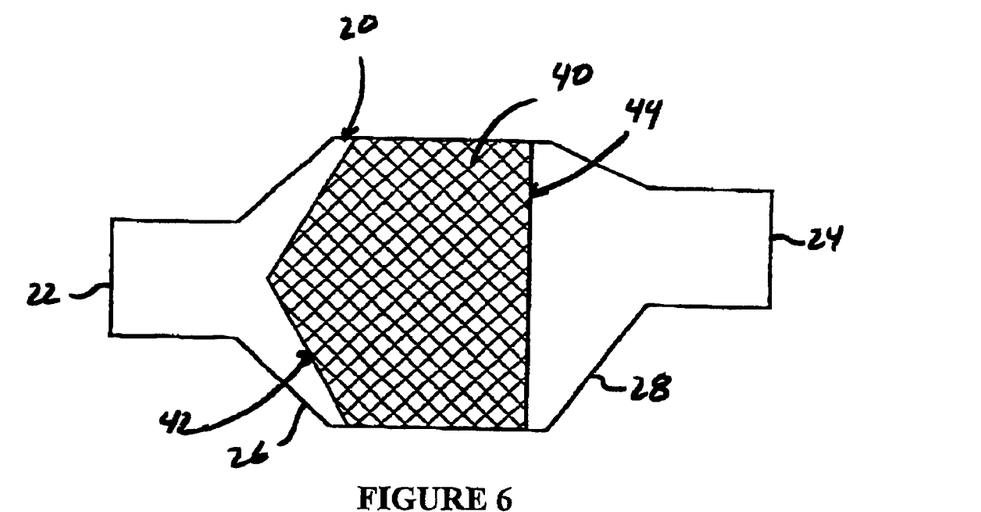
FIG. 6 is a side elevational view of an offset casing and a catalyst support having a concentric conical inlet face.
Figure 7:
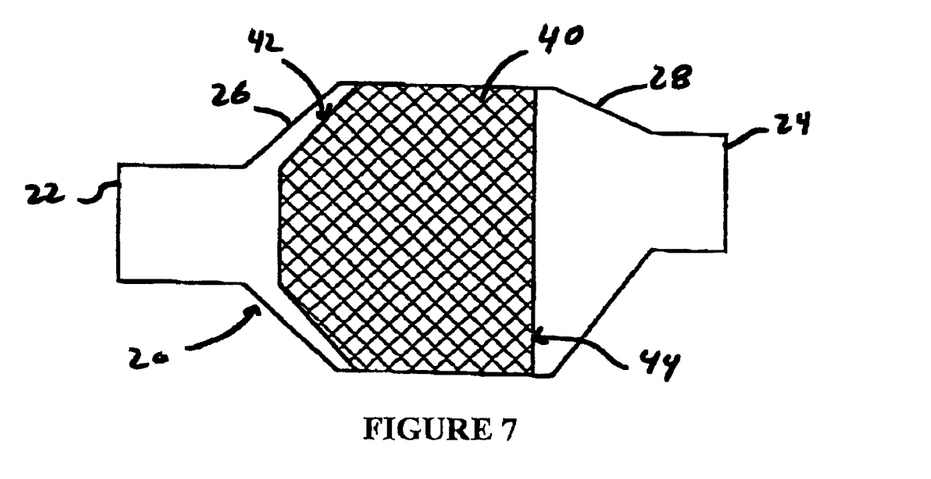
FIG. 7 is a side elevational view of an offset casing and a catalyst support having a frustoconic concentric inlet face.
Figure 8:
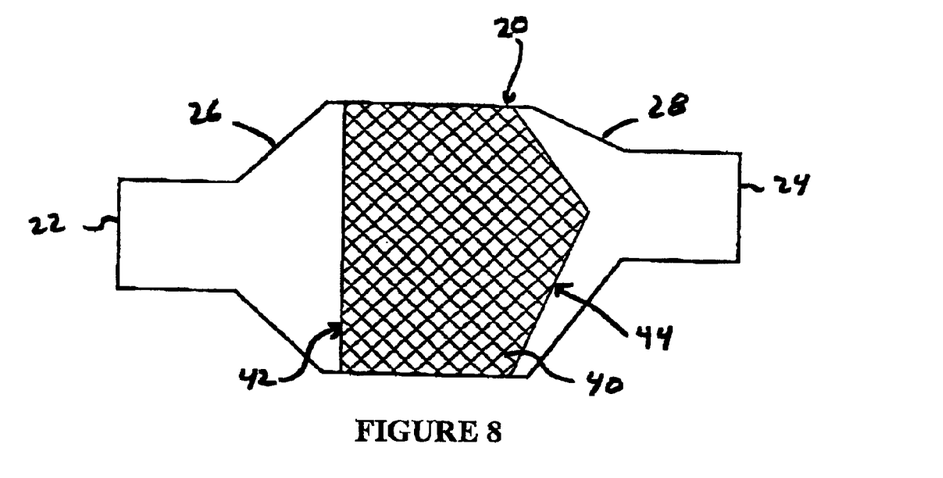
FIG. 8 is a side elevational view of an offset casing and a catalyst support having an offset conical outlet face.
Figure 9:
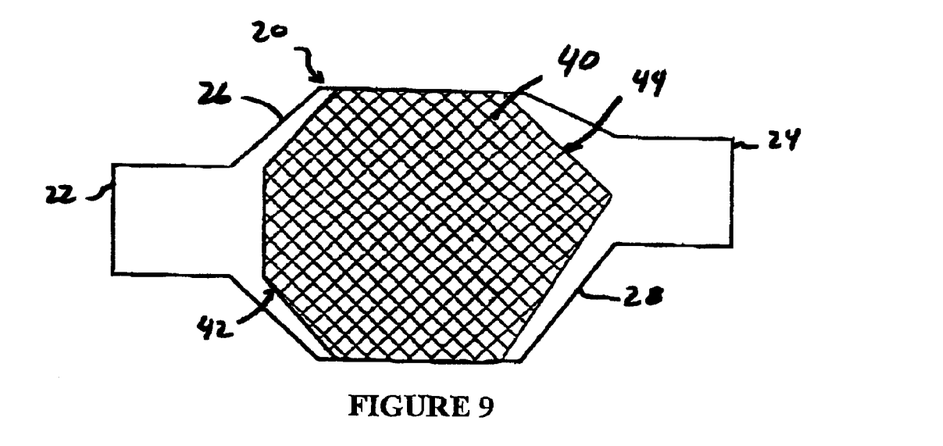
FIG. 9 is a side elevational view of an offset casing and a catalyst support having a concentric frustoconic inlet face and an offset conical outlet face.

Referring to FIG. 1, a catalytic converter 10 for purifying exhaust gases from an internal combustion engine is shown. The catalytic converter 10 includes a casing or can 20 enclosing a catalyst substrate 40 seen in (FIGS. 2–9).

The casing 20 is constructed to operably retain and locate the catalyst substrate 40 relative to a flow of exhaust gas. Depending upon the intended operating parameters the casing 20 may have a circular, non-circular or faceted cross sectional profile. A typical non-circular cross sectional profile of the casing is oval.

The can 20 is formed of a material capable of resisting under-car salt, temperature and corrosion; such as metal and particularly ferritic stainless steels including grades SS-409, SS-439, and more recently SS-441 are generally preferred. The choice of material depends on the type of gas, the maximum temperature, flow rates and the like. The casing 20 has an inlet port 22 and an outlet port 24. Gas introduced through inlet port 22 flows through the substrate 40 and out through outlet port 24.

Typically, the flow path upstream of the casing 20 is defined by a tube or pipe having a given cross sectional area. The casing 20 has a cross sectional area that is substantially greater than the cross sectional area of the upstream flow path. It is understood the casing 20 can be formed with a cross sectional area that is not substantially greater than the cross sectional area of the upstream flow path. The casing 20 includes an inlet taper 26 or flare from the cross sectional area of the inlet pipe to the cross sectional area of the casing. Similarly, the casing 20 includes an outlet taper 28 from the cross sectional area of the casing to the cross sectional area of the outlet pipe. The inlet port 22 and the outlet port 24 of the casing 20 may lie along a common axis. Alternatively, as seen in FIGS. 6–9, the inlet port 22 and outlet port 24 may be offset.

The substrate 40 is typically supported in the casing 20 by a ceramic fiber mat or wire mesh, which encircles the substrate and functions as a shock absorber and thermal insulator. In a preferred construction, the mat is intumescent. The mat has a width substantially equal to the length of the substrate 40, and is interposed between the substrate and the casing 20 so as to be wound around the substrate. The mat set by proper heating, presses the outer periphery of the substrate thereby fixing it against a drag caused by the gas flow. Flanges or ribs, may be optionally included in the catalytic converter design, and protrude from the inner periphery of the casing 20, whereby the mat is prevented from being longitudinally dislocated with respect to the casing by the drag from the gas flow or associated vibrational accelerations.

As installed in the casing 20, the substrate 40 is a catalyst substrate. However, the present invention can form a ceramic substrate that is catalytic or non-catalytic. It is understood that while the present description is set forth in terms of a catalyst substrate, this does not limit the applicability of the invention. The substrate 40 can have any of a variety of cross sectional profiles including, but not limited to elliptical, oval, circular, obround, round, faceted or any combination thereof. Typically, the substrate 40 is generally cylindrical having either a non-round (oval in this embodiment) cross section or a circular cross section. In a preferred construction, the substrate has an aspect ratio of greater than approximately 1.05.

The catalyst substrate 40 functions as the catalyst structure or carrier. In a preferred embodiment, the catalyst substrate 40 is a honeycomb substrate, which is an extruded body. The substrate 40 can be any material suitable for high temperature application such as certain metals, metal alloys, ceramics, glass-ceramics, glass, high surface area temperature stable oxides and combinations of these materials. Examples of useful substrate materials include, cordierite, mullite, clay, talc, zircon, zirconia, spinel alumina silica borides, lithium aluminosilicates, aluminasilica, feldspar titania, fused silica, nitrides, carbides and mixtures of these. Useful metals for the substrate 40 include, substrates formed of iron group metals such as Fe—Al, Fe—Cr—Al alloys, stainless steel, and Fe-nickel alloys. A preferred material for the substrate 40 is an extruded ceramic material such as cordierite.

Suitable catalysts for use on the catalyst substrate 40 are any of those catalysts which are capable not only of oxidizing hydrocarbons to form water and carbon dioxide, but also at converting carbon monoxide and $NO_x$ in the exhaust stream to innocuous products. Such catalysts are well known in the art and commonly used in automotive catalytic converters, including noble metal oxidation catalysts such as platinum, rhodium, and palladium as well as mixtures of these. Preferably, a three-way catalysts individually capable of converting $NO_x$, carbon monoxide, hydrocarbons, are preferred such as for example platinum/palladium/rhodium on gamma-alumina with rare earth oxides (i.e. ceria) or platinum on ceria-alumina combined with rhodium on zirconia. It is contemplated that these catalysts may be incorporated into the honeycomb substrate 40 by known methods. The term substrate 40 or catalyst substrate is intended to encompass catalytic substrates, substrates or substrates that support a catalyst such as catalyst substrate.

Referring to FIGS. 2–9, the catalyst substrate 40 of the present invention has an inlet face 42 and an outlet face 44. The inlet face 42 defines the first surface of the substrate 40 to contact a flow and the outlet face 44 defines the last surface of the substrate to the contact the flow.

Figure 10:
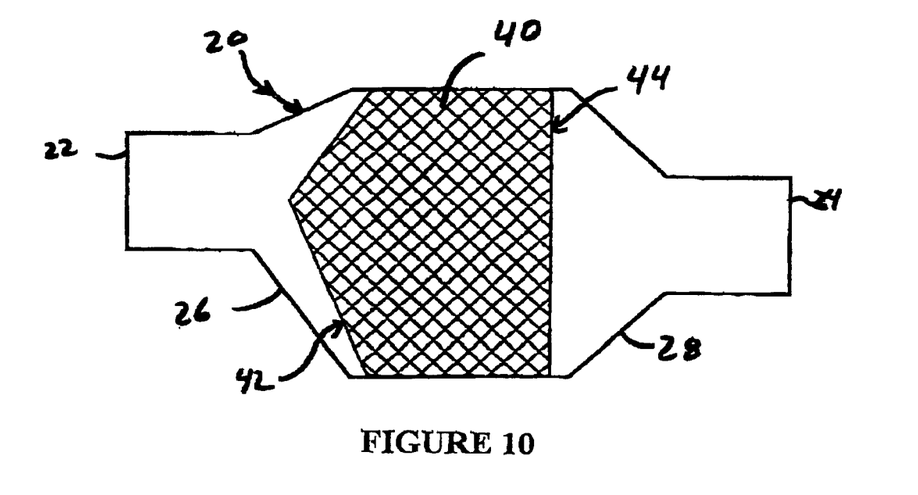
FIG. 10 is a side elevational view of an offset casing with a catalyst support having an offset conical inlet face.
Figure 11:
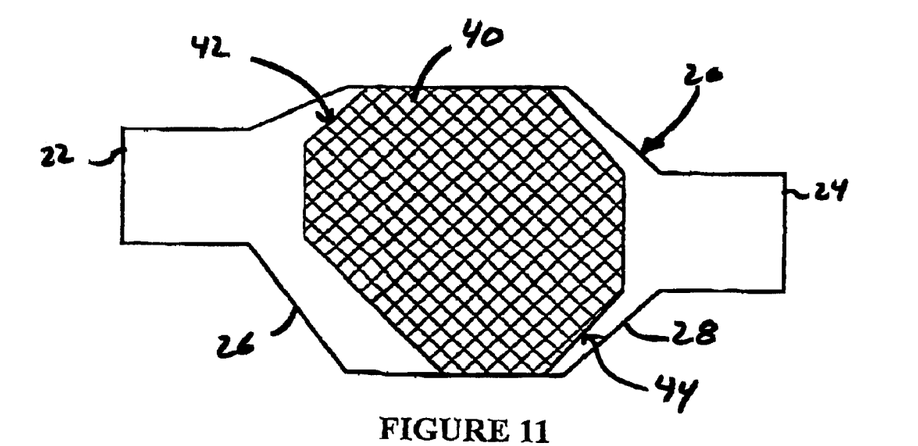
FIG. 11 is a side elevation view of an offset casing with a catalyst support having an offset frustoconical inlet face and a concentric frustoconical outlet.

The present invention provides a catalyst substrate 40 having shaped inlet or outlet faces. The shaped faces can be employed to permit the substrate to occupy at least a portion of the casing 20 volume defined by the inlet taper 26 and the outlet taper 28. Typically, the shaped inlet face 42 and outlet face 44 define a conical or frustoconical surface. The inlet face 42 can be concentric (FIGS. 2, 7 and 9) or offset from the longitudinal axis of the substrate 40 (FIGS. 10–11). Similarly, the outlet face 44 can be concentric with (FIGS. 4, 5, 8 and 9) or offset from (FIGS. 8–9) the longitudinal axis of the substrate 40. Combinations of the offset and concentric (inlet and outlet) faces are also contemplated. In addition, the relevant face may be concentric with or offset from the adjacent port in the casing 20.

It is understood the term conical defines those surfaces of a solid bounded by a base plane and formed by a line segment joining every point of the boundary of the base to a common vertex. The common vertex may lie on the longitudinal axis of the substrate 40 or be spaced from the longitudinal axis. The term frusto-conical includes those surfaces of a cone-shaped solid next to the base that is formed by cutting off the top by a plane parallel to the base. For purposes of description, each of these surfaces are encompassed by the term "shaped."

Figure 12:
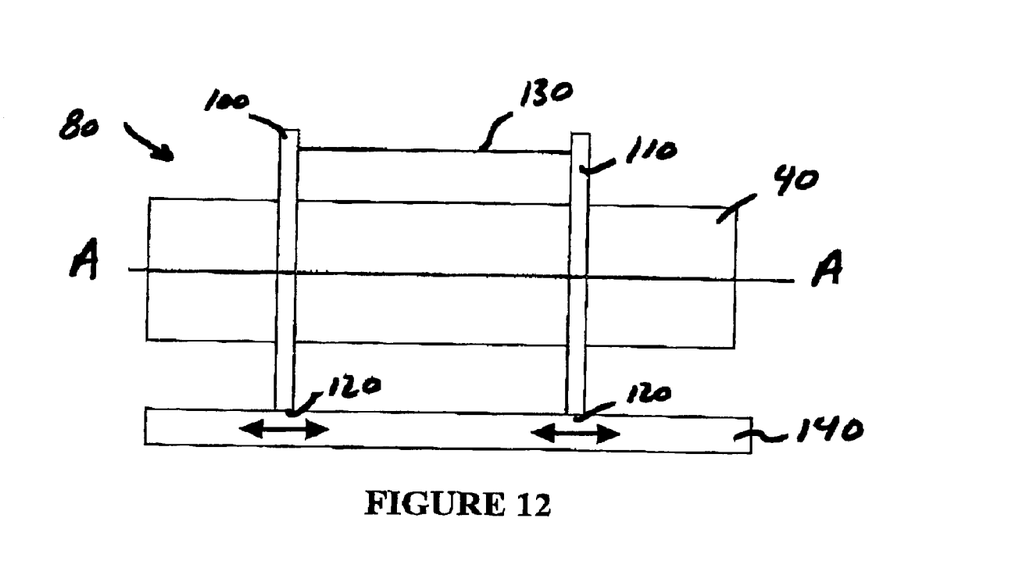
FIG. 12 is a schematic representation of an apparatus for shaping/contouring the catalyst substrate.

Referring to FIG. 12, an apparatus 80 for shaping the inlet face 42 or the outlet face 44 of the substrate 40 is shown. The apparatus 80 includes a first guide 100, a second guide 110, a drive mechanism 120 and a cutting filament 130.

A particular configuration of the apparatus 80 is selected to shape an elongate product such as an extrudate, wherein the extrudate is the catalyst substrate 40. The apparatus 80 can accommodate a catalyst substrate 40 having any of a variety of cross sectional profiles including, but not limited to circular, oval, obround, elliptical, faceted or any combination thereof. The substrate 40 has a longitudinal axis A—A, generally extending along the direction of travel of the substrate in the extrusion process. Alternatively, the longitudinal axis can be defined as the central axis extending along a length of the substrate 40.

The first guide 100 is located adjacent the extrudate, or the path of the substrate 40. The second guide 110 is also located adjacent the extrudate, or the extrusion path and is spaced along the longitudinal axis from the first guide 100. The guides 100, 110 are selected to rotate about the periphery of the substrate 40. The rotation can be in a plane transverse to the longitudinal axis of the substrate 40, or a plane that is nonorthogonal to the longitudinal axis.

The first and the second guide 100, 110 can be connected to a carriage 140, to permit longitudinal displacement of the first guide relative to the second guide. Typically, the carriage 140 is sized to support the first guide 100 and the second guide 110. The carriage is movable relative to the substrate 40 and preferably along the longitudinal axis A—A. Thus, the longitudinal distance between the first guide 100 and the second guide 110 can be selectively varied. Further, movement along the axis A—A allows forming shaped faces during extrusion of the substrate 40, without halting the extrusion process. Although the carriage 140 is described in terms of supporting both the first guide and the second guide, it is understood each of the first and the second guides 100, 110 can be carried by separate carriages.

The guides 100, 110 can be any of a variety of configurations, including, but not limited to collars, arms or rings. For purposes of the description, the guides 100, 110 are shown as collars. The collars are sized to pass the cross sectional profile of the substrate 40 through the collar. Each of the first and the second guides 100, 110 includes a respective bearing surface 102, 112 for engaging and directing the cutting filament 130. The bearing surfaces 102, 112 can have any of a variety of configurations including but not limited to lips, rims, flanges, grooves, channels or kerfs. In addition, the bearing surfaces 102, 112 may include or cooperate with a respective anchor 104, 114 for fixing a section of the cutting filament 130 relative to the guide. The anchor 104, 114 may be any of the variety of configurations including frictional grips, clamps, grooved, v-notches as well as shoulders or stops.

Figure 13:
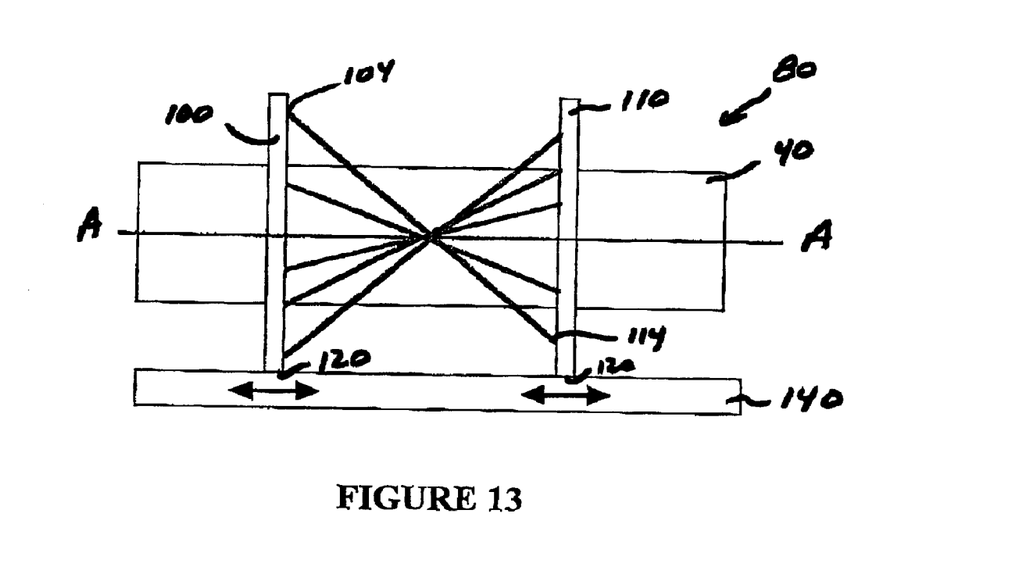
FIG. 13 is a schematic representation of the apparatus for shaping the catalyst substrate, showing a variety of cutting filament locations.

In a preferred configuration, the bearing surfaces 102, 112 of the guides 100, 110 can be located at a variety of distances from the longitudinal axis A—A. That is, the radial spacing between the bearing surface and the longitudinal axis A—A can be varied. For example, the collar can include a plurality of bearing surfaces, each bearing surface at a different distance from a center of the collar and hence, the longitudinal axis A—A of the substrate 40. This allows the cutting filament 130 to be threaded through any of the bearing surfaces and thus be located at different distances to the longitudinal axis A of the substrate 40. Alternatively, the guide can be selectively located at any of a variety of distances from the longitudinal axis A—A.

The drive mechanism 120 is connected to at least one and preferably both of the guides 100, 110. The drive mechanism 120 causes the guides 100, 110 to rotate about the longitudinal axis of the substrate 40. In a first configuration, the drive mechanism 120 causes the first guide and the second guide 110 to rotate in opposite directions. That is, one of the guides rotates in a clockwise direction and the remaining guide rotates in the counter-clockwise direction. In addition, the drive mechanism 120 can be controlled to regulate the rotation rate of the respective guide 100, 110. In alternative configurations, the drive mechanism 120 can rotate the guides 100, 110 in the same direction, at equal or differing rotation rates. Thus, the substrate 40 can be shaped "on the fly" during the extrusion process.

The drive mechanism 120 can also be connected to the guides 100, 110, either directly or through the carriage, to control the location of the guides along the longitudinal axis A—A of the substrate 40. The longitudinal separation of the guides 100, 110 can be set for a given substrate 40 or varied in conjunction with the rotation of the guides. Thus, the longitudinal and radial position of each bearing surface 102, 112 relative to the longitudinal axis A—A can be selected and controlled.

The cutting filament 130 extends between the first guide 100 and the second guide 110. Specifically, the cutting filament 130 extends from the bearing surface 102 on the first guide 100 to the bearing surface 112 on the second guide 110. Alternatively, the cutting filament 130 extends between the anchor 104 of the first guide 100 and the anchor 114 of the second guide 110.

Figure 14:
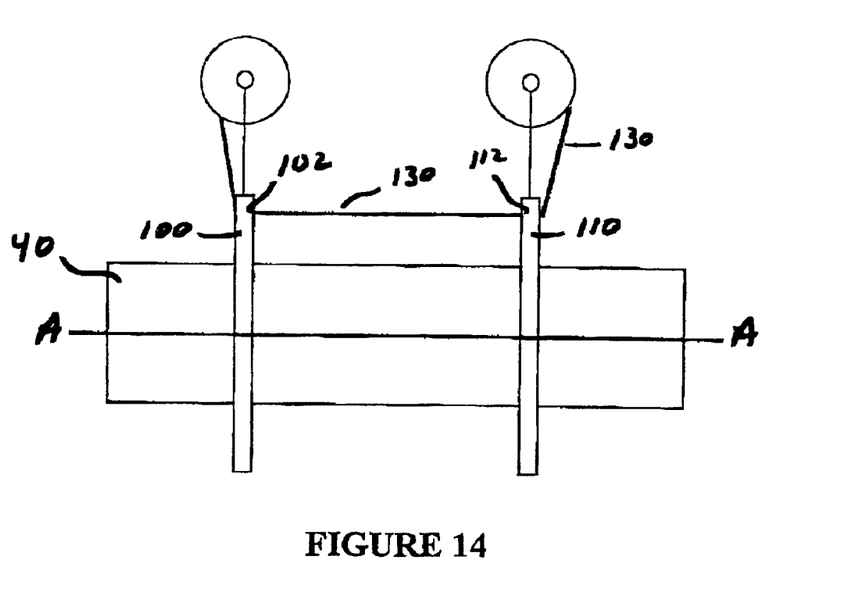
FIG. 14 is a schematic representation of the apparatus having the cutting filament disposed about an open path.
Figure 15:
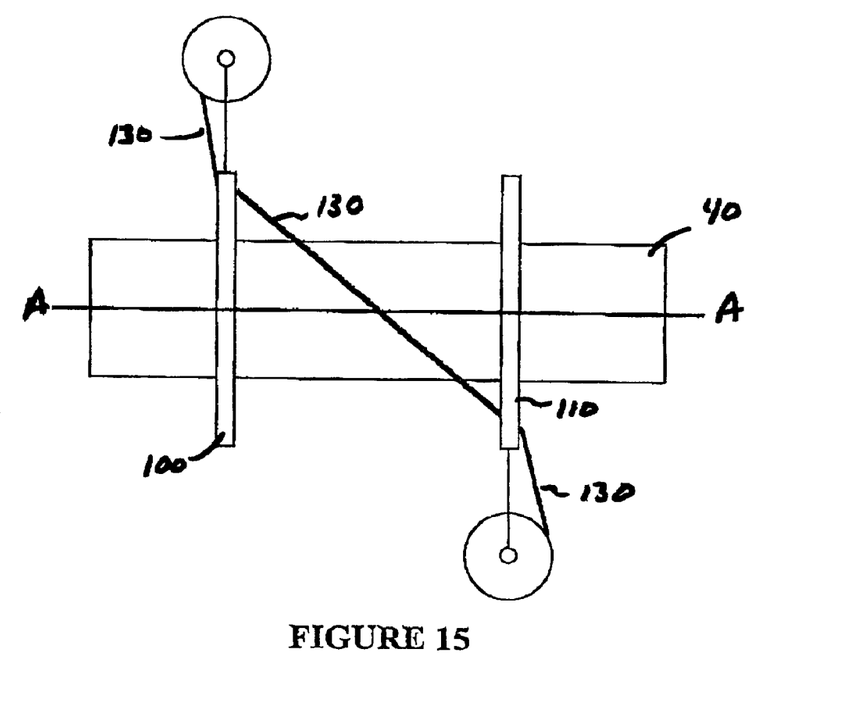
FIG. 15 is a schematic representation of the apparatus of FIG. 14 showing the cutting filament in an alternative position.
Figure 16:
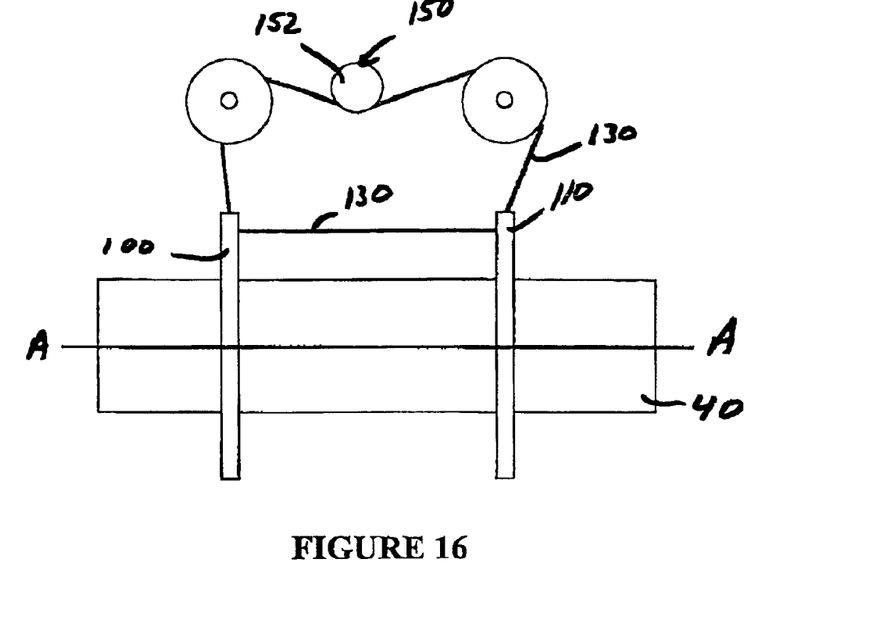
FIG. 16 is a schematic representation of the apparatus having the cutting filament disposed in a closed loop path.
Figure 17:
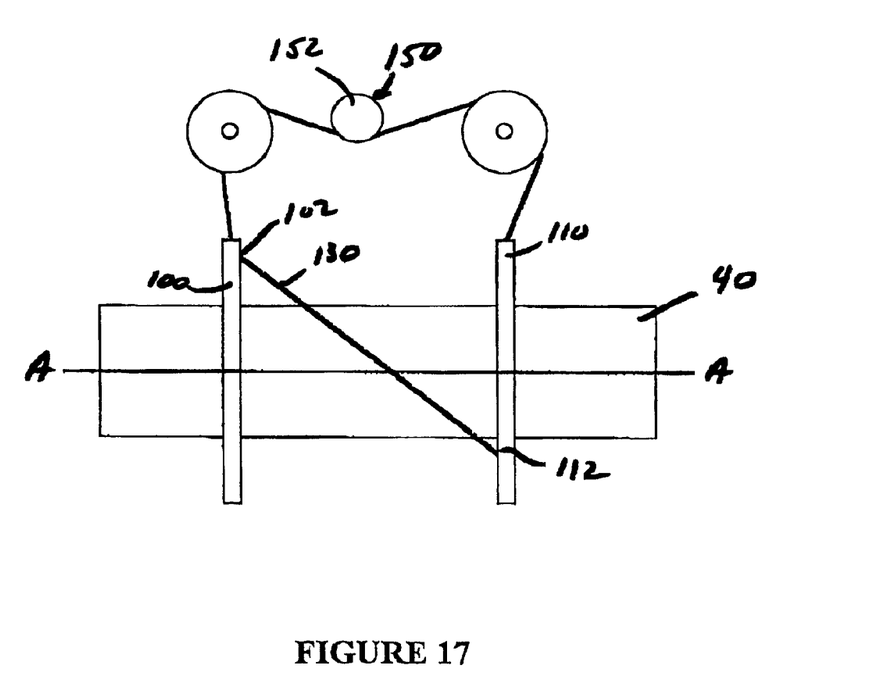
FIG. 17 is a schematic representation of the apparatus of FIG. 16 showing an alternative position of the cutting filament.

The cutting filament 130 may be a wire, cable, strand, abrasive filament, a moving filament (that is along a longitudinal axis of the filament), a heated or electrified filament. The cutting filament 130 can be in an open path configuration or a closed path configuration. Referring to FIGS. 14 and 15, in the open path configuration, the cutting filament 130 extends from a feed spool to the bearing surface on one of the guides, to the bearing surface on the remaining guide and to a take up spool. Referring to FIGS. 16 and 17, in the closed path, the cutting filament 130 is in a closed loop, wherein a section of the closed loop passes from the first guide 100 to the second guide 110.

In either the closed loop or open loop configuration, a tensioning mechanism 150 can engage the cutting filament 130 to create and maintain a predetermined tension in the cutting filament. The tensioning mechanism 150 can be an independent component or integrated into one of the elements of the apparatus. Thus, the tensioning mechanism 150 can have any of a variety of configurations. One configuration of the tensioning mechanism 150 includes a tensioning wheel 152 contacting the cutting filament 130. The tensioning wheel 152 is biased into the path of the cutting filament 130 and induces a tension in the filament. Alternatively, the tensioning mechanism 150 can be located in one of the spools. Specifically, the spool can be biased to induce a tension in the cutting filament 130, as the filament is wound or unwound from the spool. In either the closed loop or open loop configuration of the cutting filament 130, the cutting filament can be static or fixed relative to the first and the second guide 100, 110. Alternatively, the cutting filament 130 can be drawn along the closed or open path during operation. That is, the cutting filament 130 may run along its closed or open path during the cutting process.

The variables impacting the shaped inlet or outlet face include the radial distance between each bearing surface 102, 112 and the longitudinal axis A—A of the substrate 40, and spacing of the guides 100, 110 along the longitudinal axis.

Operation

In operation, a length of the substrate 40 to be cut is passed through the first collar 100 and the second collar 110. The substrate 40 to be shaped can be of a fixed length or the lead edge of a continuous extrusion. It is understood the first collar 100 and second collar 110 may be moved relative to the substrate 40, or the substrate may be moved relative to the collars.

Upon operably locating the substrate 40 relative to the collars 100, 110, the drive mechanism 120 is attached and at least one of the collars is rotated relative to the remaining collar and the substrate 40. This rotation causes the cutting filament 130 to pass through the substrate 40 as the bearing surface of the guide causes the filament to rotate about the longitudinal axis of the substrate. Specifically, the cutting filament 130 passes through the longitudinal axis A of the substrate 40. Upon completion of a full "relative" rotation between the bearing surfaces 102, 112, the substrate 40 is cut. Alternatively, the bearing surfaces 102, 112 can initially be disposed 180° apart and each bearing surface then completes a rotation in the same direction to cut the substrate 40.

By rotating the first and second guide in opposite directions, a shaped face may be formed on the newly created upstream and downstream end of the substrate 40. It is also understood that the shaped faces can be on two separate substrates, wherein each can be operably located with the shaped face at the upstream end or the downstream end.

During rotation of the guides 110, 110, the cutting filament 130 may travel along its path in the closed loop or open loop configuration. Further, the radial and longitudinal spacing of the bearing surfaces 102, 112 can be controlled during cutting to shape the substrate 40. By selecting the first guide 100, the second guide 110, the first bearing surface 102, the second bearing surface 112 and the drive mechanism, the shaped faces of the substrate 40 can be symmetric, asymmetric, concentric or non-concentric with the longitudinal axis.

While the invention has been described in connection with a presently preferred embodiment thereof, those skilled in the art will recognize that many modifications and changes made can be made therein without departing from the true spirit and scope of the invention, which accordingly is intended to be defined solely by the appended claims.

What is claimed is:

1. A method for shaping an end face of a catalyst substrate having a longitudinal axis into a conical or frusto-conical shape which comprises:
    a step of shaping by rotating first and second guides about the longitudinal axis of the catalyst substrate while a cutting filament extends between the guides; and
    controlling the longitudinal separation and radial spacing of the guides so that the cutting filament is inclined relative to the longitudinal axis of the catalyst substrate and intersects the said axis.

2. The method of claim 1 wherein the first guide and the second guide are located adjacent the catalyst substrate.

3. The method of claim 1, further comprising rotating the first guide relative to the second guide.

4. The method of claim 1 wherein the cutting filament is disposed about an open path that includes a path section extending between the first guide and the second guide.

5. The method of claim 1 wherein the cutting filament is disposed about a closed path that includes a path section extending between the first guide and the second guide.

6. The method of claim 1 wherein the longitudinal separation and radial spacing of the guides are controlled to form a shaped face on the catalyst substrate which is concentric with the longitudinal axis thereof.

7. A method for shaping an end face of a catalyst substrate having a longitudinal axis into a conical or frusto-conical shape which comprises:
    a step of shaping by rotating first and second guides about the longitudinal axis of the catalyst substrate while a cutting filament extends between the guides; and
    controlling the longitudinal separation and radial spacing of the guides so that the cutting filament is inclined relative to the longitudinal axis of the catalyst substrate and intersects the said axis, and wherein
    the longitudinal separation and radial spacing of the guides are controlled to form a shaped face on the catalyst substrate which is non-concentric with the longitudinal axis thereof.

* * * * *